United States Patent
Armangau et al.

(10) Patent No.: US 11,216,199 B2
(45) Date of Patent: Jan. 4, 2022

(54) APPLYING DEDUPLICATION DIGESTS TO AVOID SAME-DATA WRITES

(71) Applicant: EMC IP Holding Company LLC, Hopkinton, MA (US)

(72) Inventors: Philippe Armangau, Acton, MA (US); Monica Chaudhary, South Grafton, MA (US); Ajay Karri, South Grafton, MA (US); Alexander Daniel, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 16/176,756

(22) Filed: Oct. 31, 2018

(65) Prior Publication Data

US 2020/0133547 A1 Apr. 30, 2020

(51) Int. Cl.
*G06F 3/06* (2006.01)
*G06F 16/907* (2019.01)

(52) U.S. Cl.
CPC .......... *G06F 3/0641* (2013.01); *G06F 3/0608* (2013.01); *G06F 3/0683* (2013.01); *G06F 16/907* (2019.01)

(58) Field of Classification Search
CPC .... G06F 3/0641; G06F 3/0608; G06F 3/0683; G06F 16/907
See application file for complete search history.

(56) References Cited

U.S. PATENT DOCUMENTS

| | | | |
|---|---|---|---|
| 5,218,695 A * | 6/1993 | Noveck | G06F 3/0601 |
| 6,374,266 B1 * | 4/2002 | Shnelvar | G06F 11/1453 |
| 8,577,850 B1 * | 11/2013 | Genda | G06F 3/0641 |
| | | | 707/692 |
| 8,799,601 B1 | 8/2014 | Chen et al. | |
| 9,122,641 B1 * | 9/2015 | Gunda | G06F 11/1458 |
| 9,569,455 B1 | 2/2017 | Bono et al. | |
| 9,916,112 B1 | 3/2018 | Taylor et al. | |
| 10,037,336 B1 | 7/2018 | Hu et al. | |
| 2002/0083037 A1 * | 6/2002 | Lewis | G06F 11/1435 |
| 2004/0139273 A1 * | 7/2004 | Doucette | G06F 3/0689 |
| | | | 711/100 |
| 2008/0098083 A1 * | 4/2008 | Shergill | G06F 11/1453 |
| | | | 709/217 |
| 2008/0294696 A1 * | 11/2008 | Frandzel | G06F 3/0608 |
| 2010/0250896 A1 * | 9/2010 | Matze | G06F 3/0608 |
| | | | 711/216 |

(Continued)

OTHER PUBLICATIONS

Armangau, Philippe, et al.; "Inline Deduplication of Compressed Data," U.S. Appl. No. 14/980,944, filed Dec. 28, 2015.

(Continued)

*Primary Examiner* — Prasith Thammavong
*Assistant Examiner* — Richard L Sutton
(74) *Attorney, Agent, or Firm* — BainwoodHuang

(57) ABSTRACT

A technique for managing write requests in a data storage system checks whether newly-arriving data match previously-stored data that have been recorded in a deduplication database. If a match is found, the technique compares mapping metadata for the newly-arriving data with mapping metadata for the matching data. If both sets of metadata point to the same storage location, then the newly-arriving data is a same-data write and a new write to disk is avoided.

23 Claims, 4 Drawing Sheets

(56) References Cited

U.S. PATENT DOCUMENTS

| | | | | |
|---|---|---|---|---|
| 2012/0150917 A1* | 6/2012 | Sundaram | ............ | G06F 16/2379 |
| | | | | 707/803 |
| 2017/0083537 A1* | 3/2017 | Vellore Ramesh | ........................... | |
| | | | | G06F 16/1748 |
| 2017/0177266 A1* | 6/2017 | Doerner | .............. | G06F 12/0261 |
| 2017/0208125 A1* | 7/2017 | Jai | ....................... | H04L 67/1097 |
| 2018/0000394 A1 | 2/2018 | Shadrin et al. | | |

OTHER PUBLICATIONS

Armangau, Philippe, et al.; "Speeding De-Duplication Using a Temporal Digest Cache," U.S. Appl. No. 15/668,388, filed Aug. 3, 2017.

Armangau, Philippe, et al.; "Speeding Deduplication Using a Most Wanted Digest Cache," U.S. Appl. No. 15/799,117, filed Oct. 31, 2017.

Swift, Jeremy; "Deduplication and Compression of Data Segments in a Data Storage System," U.S. Appl. No. 15/976,371, filed May 10, 2018.

\* cited by examiner

EXTENT-MAPPING TABLE
136a

| Extent | VBM Loc, Idx |
|---|---|
| E1 | VBM-C, 3 |
| E2 | VBM-C, 4 |
| E3 | --------- |
| E4 | VBM-D, 2 |
| E5 | VBM-A, 6 |
| ... | ... |

210 → Extent column
220 ↗, 230 ↗

Associates extents 135 in current batch 134 with Mapping Metadata 154C

*FIG. 2*

BATCH-FLUSH TABLE
136b

| Extent | Action |
|---|---|
| E1 | NO-OP |
| E2 | NO-OP |
| E3 | Allocate |
| E4 | Overwrite |
| E5 | Dedupe |
| ... | ... |

310 → Extent column
320 ↗, 330 ↗

Associates extents 135 in current batch 134 with Actions to be performed upon flush from Data Log 132

*FIG. 3*

APPLYING DEDUPLICATION DIGESTS TO AVOID SAME-DATA WRITES

BACKGROUND

Data storage systems are arrangements of hardware and software that include storage processors coupled to arrays of non-volatile storage devices, such as magnetic disk drives, electronic flash drives, and/or optical drives. The storage processors service storage requests, arriving from host machines ("hosts"), which specify blocks, files or other data elements to be written, read, created, deleted, and so forth. Software running on the storage processors manages incoming storage requests and performs various data processing tasks to organize and secure the data elements stored on the non-volatile storage devices.

Storage systems often store large numbers of copies of identical or nearly-identical files. Virtual machine disks provide a common example, as a golden image of a virtual machine disk can be propagated many times in a storage system to support many concurrent users.

To address the high redundancy that comes with storing many copies of the same data objects, some storage systems offer a service called "deduplication." Deduplication works by replacing redundant copies of data elements with pointers to a single retained copy. Using deduplication, for example, hundreds of identical virtual machine disks can all be stored in only marginally more space than is required for storing a single virtual machine disk.

In addition, a common practice among clients of data storage systems is to open a file, modify the file, and save the file to preserve the changes. For instance, the very same activities that individual users perform many times a day on their desktop computers, to open, edit, and save files, tend to be performed on a much larger scale in a data storage system, which may store thousands or millions of files of many users and/or client applications.

SUMMARY

Unfortunately, many data storage systems do not distinguish between new-data writes of new data and same-data writes of the same data. For instance, when opening a file for editing, a data storage system might read blocks of the file on disk into a set of memory pages, make changes to the contents of the memory pages, and then write the memory pages back out to the blocks on disk. With no way of distinguishing new-data writes from same-data writes, the data storage system might write out every single block that it read, regardless of whether the contents of the block have been changed. The data storage system might also write out any metadata blocks that map every block that is read, causing the useless activity to multiply. This approach exercises disk drives much more than is necessary, as many writes that the disk drives perform are simply writing the exact same data or metadata that is already there. The deficiency is particularly acute when the disk drives are provided as electronic flash drives. As is known, electronic flash drives degrade over time in response to being written. Thus, same-data writes can severely shorten the lifespans of electronic flash drives, leading to their early failure and need for replacement.

In contrast with prior approaches, an improved technique for managing write requests in a data storage system checks whether newly-arriving data match previously-stored data that have been recorded in a deduplication database. If a match is found, the technique compares mapping metadata for the newly-arriving data with mapping metadata for the matching data. If both sets of metadata point to the same storage location, then the newly-arriving data is a same-data write and a new write to disk is avoided.

Advantageously, the improved technique avoids exercising disk drives for performing redundant, same-data writes, and thus preserves the disk drives and extends their lifespans, particularly when the disk drives are flash drives. In addition, throughput of the data storage system is increased, as time-consuming writes are avoided for data that is already stored. The data storage system can thus run faster and consume less power.

In some examples, avoidance of same-data writes also accompanies avoidance of same-metadata writes, e.g., for metadata that maps the data subject to the same-data writes. Avoidance of same-data writes can thus have a cascading effect in avoiding useless and detrimental activities in the data storage system.

Certain embodiments are directed to a method of managing write requests in a data storage system. The method includes receiving an I/O (Input/Output) request that specifies a current extent of data to be written to a specified logical address and collecting mapping metadata that maps the specified logical address to a corresponding storage location. The method further includes performing a dedupe-match test on the current extent, the dedupe-match test configured to (i) produce a first result in response to the current extent matching an entry in a deduplication database, and (ii) produce a second result otherwise, the deduplication database having multiple entries for respective extents of previously stored data, each entry including a reference to metadata that maps the respective extent to a respective storage location. In response to detecting that the dedupe-match test has produced the first result, the method still further includes performing a metadata-match test for the current extent, the metadata-match test configured to (i) produce a Match result in response to the metadata referenced by the matching entry and the mapping metadata of the current extent pointing to a same storage location, and (ii) produce a No-Match result otherwise. In response to the metadata-match test producing the Match result, the method completes the I/O request without performing any write of the current extent to persistent storage.

Other embodiments are directed to a data storage system constructed and arranged to perform a method of writing data, such as the method described above. Still other embodiments are directed to a computer program product. The computer program product stores instructions which, when executed on control circuitry of a data storage system, cause the data storage system to perform a method of writing data, such as the method described above.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 2 is a block diagram showing an example extent-mapping table of FIG. 1.

FIG. 3 is a block diagram showing an example batch-flush table of FIG. 1.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for managing write requests in a data storage system checks whether newly-arriving data match previously-stored data that have been recorded in a deduplication database. If a match is found, the technique compares mapping metadata for the newly-arriving data with mapping metadata for the matching data. If both sets of metadata point to the same storage location, then the newly-arriving data is a same-data write and a new write to disk is avoided.

Figure 1:
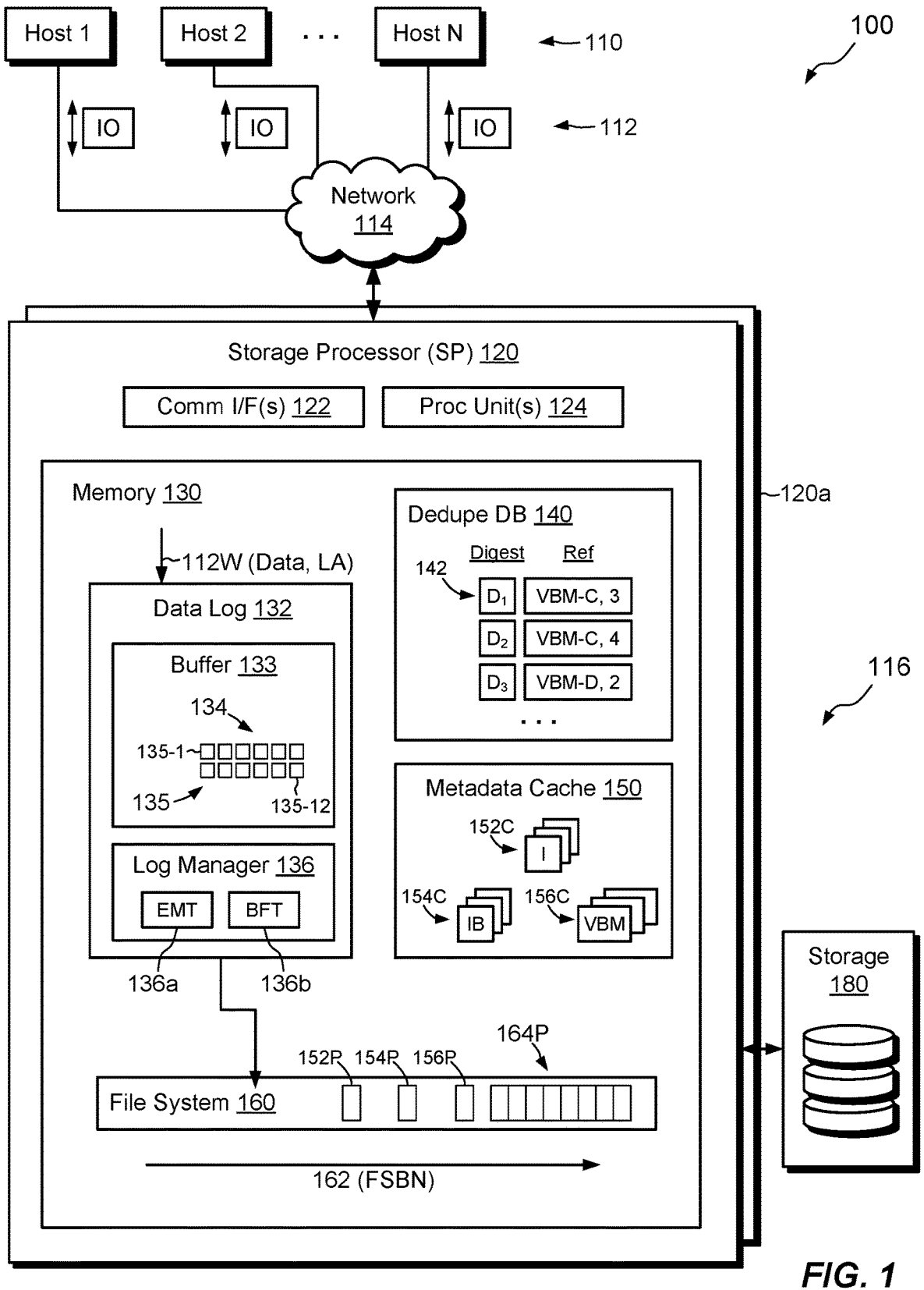
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to a form suitable for use by the SP 120. The set of processing units 124 includes one or more processing chips and/or assemblies, such as numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by operation of software instructions, a data log 132, a deduplication ("Dedupe") database 140, a metadata cache 150, and a file system 160. The data log 132 includes a buffer 133 and a log manager 136, which itself includes an extent-mapping table (EMT) 136a and a batch-flush table (BFT) 136b. The buffer 133 is configured to receive incoming data specified by I/O write requests 112W and to aggregate the received data into batches 134 (a single batch shown). Each batch 134 includes multiple extents 135 (e.g., 135-1 to 135-12), which may be ordered, for example, by time of receipt into the data log 132. The data log 132 is itself configured to hold incoming data temporarily (in volatile memory) until the data can be placed in appropriate locations, such as in the file system 160, which is backed by the storage 180.

The dedupe database 140 is configured to store digest entries 142 of respective extents of data, such as data blocks, sub-blocks, or other denominations of data. For example, the dedupe database 140 stores, for each of multiple data blocks, a digest "D" of that data block and a reference ("Ref") to mapping metadata that points to a location where the data block is persistently stored. Each digest is computed as a hash of the respective data block's contents. Thus, different data blocks produce different digests and each digest uniquely identifies a respective data block, with hash collisions being possible but highly improbable. The reference Ref is typically a pointer to a VBM (virtual block map), which in turn points to the data block. The VBM pointed to by reference Ref is typically a cached version of the VBM in the metadata cache 150. In some examples, the dedupe database 140 is backed by persistent storage, with portions read into volatile memory as needed for fast access.

The metadata cache 150 is a volatile-memory structure that temporarily holds file-system metadata, such as inodes 152C, indirect blocks (IBs) 154C, and VBMs 156C. In some examples, different caches are provided for different types of metadata.

The file system 160 is a software structure that organizes files. The file system 160 has an address space 162, which ranges, for example, from zero to some large number. In some contexts, the address space 162 may be referred to as a "physical" address space, to distinguish it from logical addresses of data objects hosted by the data storage system 116. The physical address space 162 is denominated in blocks, with each block address identified by File System Block Number, or "FSBN." A "block" is typically the smallest unit of storage space that the file system 160 can allocate. Blocks in the file system 160 are normally uniform in size, with typical block sizes being 4 kB or 8 kB, for example.

The file system 160 stores persistent data structures, such as data blocks 164P and metadata blocks, such as inode blocks 152C, persistent IBs 154P, and persistent VBMs 156P. Modes 152P define files and are provided one per file. An inode may store pointers to VBMs and/or to IBs 154P, which themselves store arrays of pointers to data of a respective file. IBs may be arranged in multiple layers, forming an IB tree, with IBs in the bottom layer called "leaf IBs." Such leaf IBs include pointers to VBMs 156P, which in turn point to data blocks 164P. As is known, VBMs support block virtualization and allow data blocks 164P to be moved without having to adjust block pointers in IBs 154P, which tend to be numerous and widely dispersed. VBMs also facilitate block deduplication, as multiple IB block pointers for different logical addresses may point to the same VBM, which may point to a single data block 164P, thus enabling different files or ranges to share the same data block 164P.

As is known, "logical addresses" are addresses of data objects which may be specified based on various user-access protocols. Within the data storage system 116, logical addresses of data objects are mapped to storage locations, such as FSBNs. VBMs permit different logical addresses to map to the same storage locations, thus enabling block-sharing between different files, different ranges of files, and/or different types of data objects.

In some arrangements, the file system 160 arranges certain data blocks 164P in segments (not shown), i.e., ranges of multiple contiguous FSBNs, and each segment may store many block's worth of compressed data. For instance, an 8-block segment might store 12 or 16 block's worth of compressed data. In such examples, a VBM points to both a segment and to an index, where the index provides a location of a compressed block within the segment.

In example operation, hosts 110 issue I/O requests 112 to the data storage system 116. The I/O requests 112 direct the data storage system 116 to perform reads and/or writes of one or more data objects, such as LUNs, file systems, virtual machine disks, and the like. The SP 120 receives the I/O requests 112 at the communication interface(s) 122 and passes them to memory 130 for further processing. Some of the I/O requests 112 are writes 112W directed to one or more data objects. In an example, each write 112W specifies both data to be written and a logical address (LA) at which the data are to be stored. The logical address may be provided as a LUN and an offset, as a file system identifier (FSID) along with a file name and offset, as an NFS handle, or in some other suitable manner. In some examples, the SP 120 operates additional object layers (not shown) above the file system 160, and the SP 120 may map a logical address that accompanies a write request 112W to a different logical address relative to the file system 160.

As new data arrive in writes 112W, the buffer 133 receives the specified data and places them in block-sized extents 135. The log manager 136 aggregates extents 135 into batches 134. In some examples, each batch 134 contains a predetermined number of extents 135, such as twelve extents per batch. For each extent 135, the data log 132 stores a descriptor that identifies the logical address to which the respective data are directed.

The log manager 136 performs various processing tasks on a per-batch basis. In typical operation, the log manager 136 obtains a batch 134, compresses each of the extents 135 in the batch 134, and compacts the compressed extents into a contiguous range of memory. The log manager 136 may then flush the contiguous range of memory for the batch 134 to the file system 160. The file system 160 allocates new data blocks for holding the data and effects storage of the data in the newly allocated blocks.

Some of the extents 135 in the batch 134 may be directed to logical addresses for which mapping metadata, such as inodes, IBs, and VBMs, have already been created. For such extents, the log manager 136 collects the mapping metadata, e.g., by collecting pointers to such metadata in the metadata cache 150, and creates the extent-mapping table 136a, which associates each extent with its respective mapping metadata.

The log manager 136 may vary its typical processing if it can identify an extent 135 as a same-data write. Same-data writes are simply writes of the same data that are already stored. In accordance with improvements hereof, the log manager 136 detects extents 135 that are same-data writes and avoids performing any write operations for the detected extents of their mapping metadata.

For example, the log manager 136 obtains a current extent 135, received in an I/O request 112W from a current batch 134, and performs a deduplication test on the current extent 135. To this end, the log manager 136 computes a hash of the contents of the current extent 135 and performs a lookup into the dedupe database 140 using the computed hash as a key. If a matching entry 142 is found, the deduplication test passes; otherwise, it fails.

If the deduplication test passes, the current extent 135 might be a same-data write (alternatively, it could be a deduplication hit, or a stale hit). To confirm that the current extent 135 is a same-data write, the log manager 136 performs a metadata-match test. For instance, the log manager 136 accesses the matching entry 142 from the dedupe database 140 and follows its reference Ref to the indicated mapping metadata. The referenced metadata may be a VBM (e.g., VBM-C) that points to the data block for which the matching entry was created. The reference may also specify an index (e.g., 3), which identifies a location within a pointed-to segment (e.g., when segments are used for storing compressed data). The log manager 136 looks up the current extent 135 in the extent-mapping table 136a. If the mapping metadata associated with the current extent 135 lists the same VBM (and index, if provided) for the current extent as the VBM accessed for the matching entry 142, then a same-data write is confirmed. The deduplication test has confirmed that the contents are the same, and the metadata-match test has confirmed that the storage location is the same. Therefore, it is the same data. It is also the same metadata.

Once the same-data match is confirmed, the log manager 132 may signal this fact when performing its flush of the batch 134, by specifying no action for the current extent 135 in the batch-flush table 136b. When the batch 134 is flushed, the file system 160 receives the batch-flush table 136 and takes no action to store the current extent 135 or to update its mapping metadata. The same-data write is thus avoided, as are multiple same-metadata writes. The data storage system 116 completes the I/O request 112W without performing any write of the current extent or its mapping metadata to persistent storage. As the file system 160 typically employs multiple metadata blocks for mapping a single data block, avoidance of a same-data write can have a cascading effect in avoiding multiple unnecessary block updates.

FIG. 2 shows an example arrangement of the extent-mapping table 136a. Here, the extent-mapping table 136a has multiple entries 210, with each entry identifying a respective extent 220 (E1, E2, . . . ) in the current batch 134 and its associated mapping metadata 230, such as a VBM and (if supported) and index. In the example shown, extents E1 and E2 map to the same VBM, but to different indices. Extent E3 is associated with no mapping metadata 230. For example, the data storage system 116 may not have previously mapped the logical address specified for extent E3. One should appreciate that the extent-mapping table 136a is specific to a particular batch 134 and that its contents change from one batch to the next.

FIG. 3 shows an example batch-flush table 136b. The batch-flush table 136b has multiple entries 310, with each entry identifying a respective extent 320 and a corresponding action 330. In an example, each action 330 is specified at least in part based on results of the deduplication test and the metadata-match test. For instance, if both tests pass, the action 330 may be a no-op (no action), as the write is a same-data write. If only the dedupe test passes, the action 330 may be a dedupe. If the dedupe test fails, the action may be an overwrite or an allocating write. As with the extent-mapping table 136a, the batch-flush table 136b is also specific to a particular batch 134 and its contents change from one batch to the next.

Figure 4:
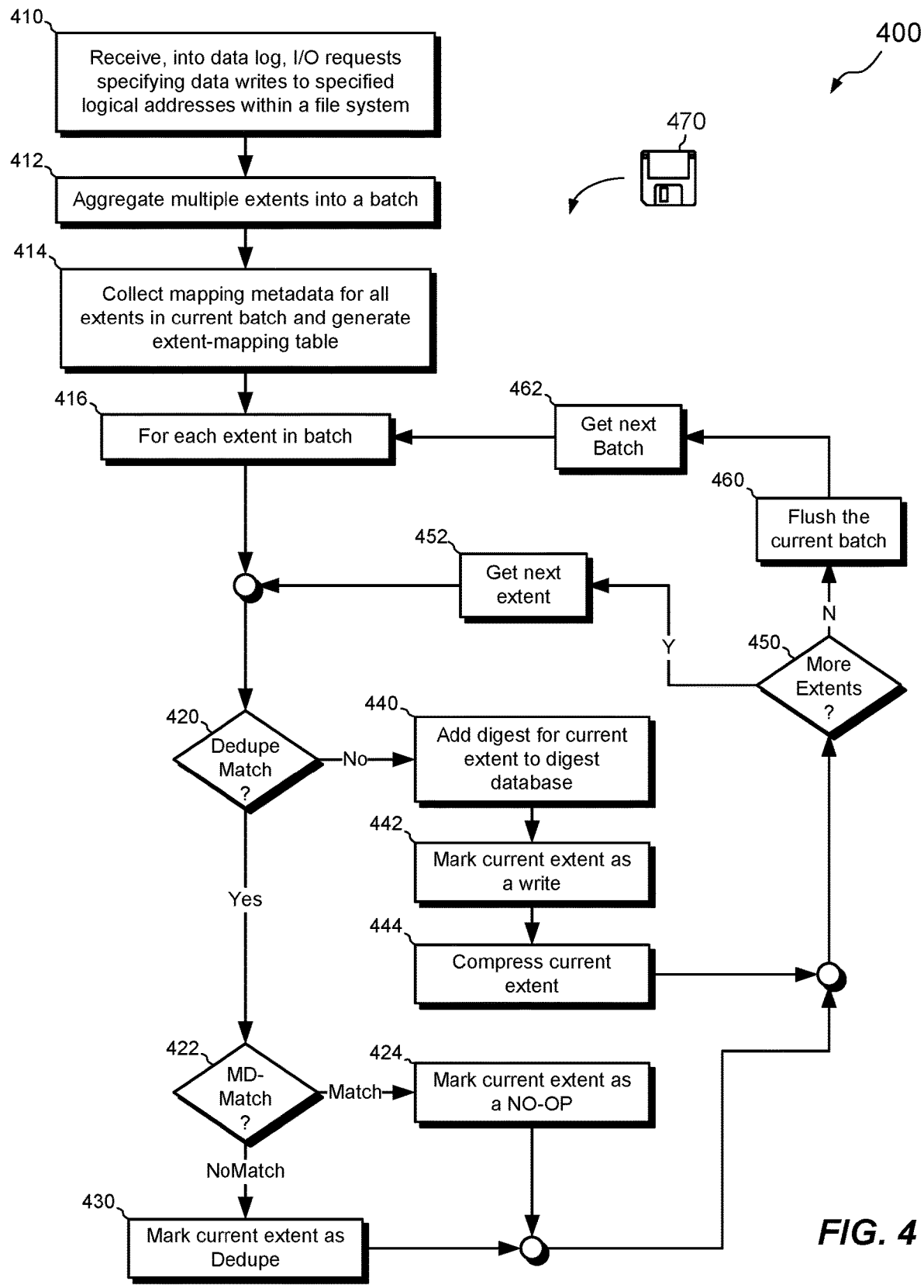
FIG. 4 is a flowchart that shows an example method of writing data in the data storage system of FIG. 1.
Figure 5:
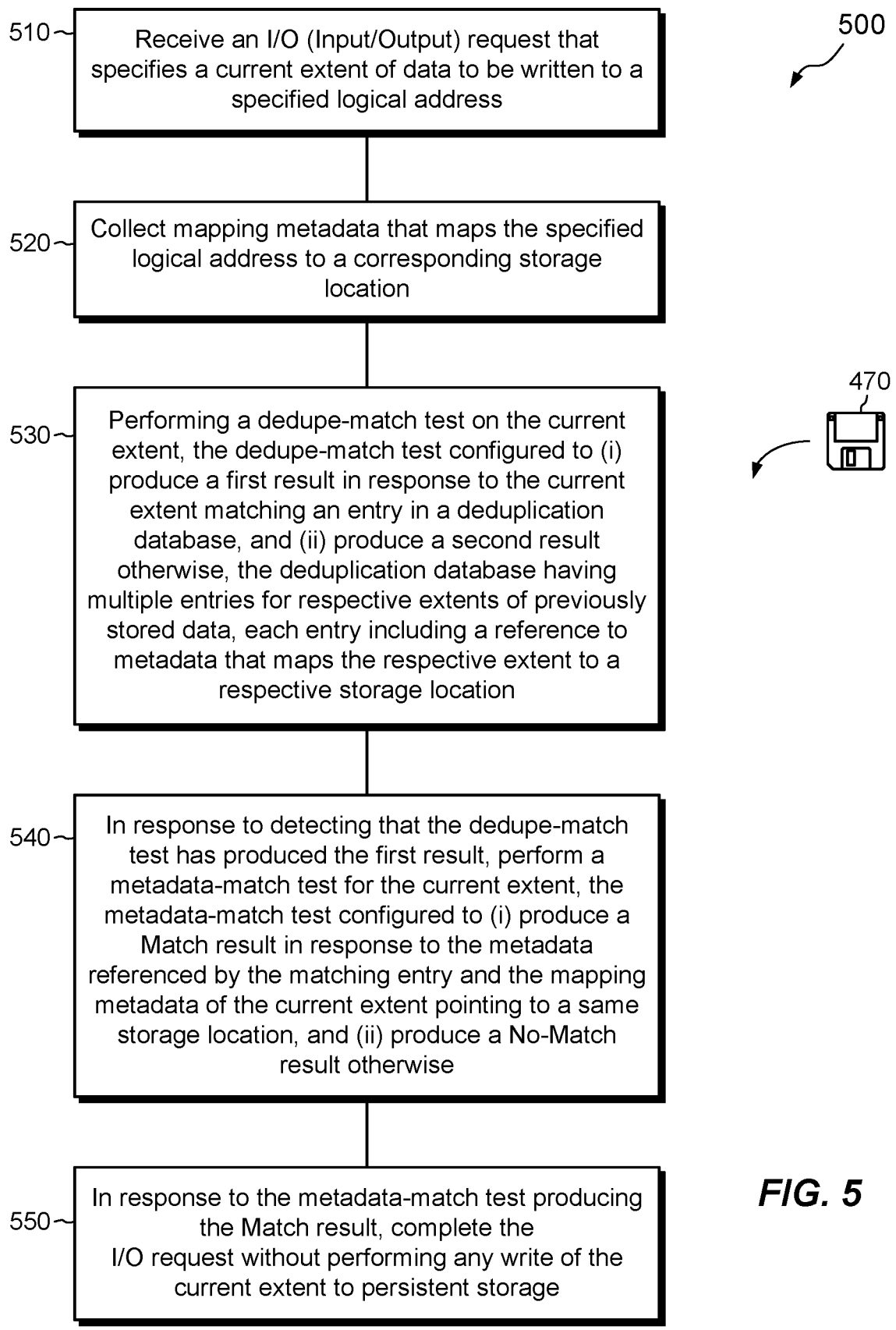
FIG. 5 is a flowchart that shows an example method of managing write requests in the data storage system of FIG. 1.

FIGS. 4 and 5 show example methods that may be carried out in connection with the environment 100. The methods are typically performed, for example, by the software constructs described in connection with FIG. 1, which reside in the memory 130 of the storage processor 120 and are run by the set of processing units 124. The various acts of these methods may be ordered in any suitable way. Accordingly, embodiments may be constructed in which acts are performed in orders different from those illustrated, which may include performing some acts simultaneously.

FIG. 4 shows an example method 400 for performing writes in the data storage system 116. At 410, the data storage system 116 receives I/O requests 112W from hosts 110. Each I/O request 112W specifies a write of respective data at a respective logical address. The data storage system 116 receives the data specified by each such write into the data log 132, and the buffer 133 holds the data in block-sized extents 135.

At 412, the buffer 133 aggregates extents 135 into batches 134. The buffer 133 may use any suitable technique for aggregating extents 135, with one example being to place extents 135 in batches 134 on a time-ordered basis, based on time of receipt.

At 414, the log manager 136 collects mapping metadata for all extents 135 in the current batch 134 and generates the extent-mapping table 136a.

At 416, the log manager 136 obtains a current extent 135 from the current batch 134 and proceeds to process the current extent 135.

For example, at 420, the log manager 136 performs the deduplication-match test, e.g., by hashing the contents of the current extent 135 and performing a lookup into the dedupe database 140, using the computed hash value as the key.

If a match is found (Yes) to an entry 142 in the dedupe database 140, operation proceeds to 422, whereupon the log manager performs the metadata-match test, e.g., by determining whether the referenced VBM in the matching entry 142 is the same as the VBM listed for the current extent 135 in the extent-mapping table 136a. If the result is a match, operation proceeds to 424, whereupon the log manager 136 marks the current extent 135 as a no-op (no action) in the batch-flush table 136b.

If more extents are left in the current batch 134 (at 450), then the log manager 452 gets a new extent and operation returns to 420, whereupon the deduplication test is performed on the new extent.

Returning to 422, if the metadata-match test fails (No Match), then operation proceeds to 430, and the log manager 136 marks the current extent 135 as a dedupe. It is noted that additional testing may be required in order to confirm that deduplication is proper. Assuming there are more extents (450), the next extent is obtained (452) and processed as described above.

Returning to 420, if the deduplication test fails (No), then operation proceeds to 440, whereupon the log manager 136 directs the dedupe database 140 to add a new digest entry 142 for the current extent 135. For example, the dedupe database 140 obtains the computed hash of the current extent 135 (from 420) and creates the new entry 142 using the hash value as the key. Adding a new digest entry 142 enables a match to be found the next time an extent having the same contents as the current extent 135 arrives. At 442, the log manager 136 marks the current extent 135 as a write in the batch-flush table 136b. At 444, the log manager 136 compresses the current extent 135. Assuming there are more extents (450), the next extent is obtained (452) and processed as described above.

The activity continues until all extents in the current batch 134 have been processed, at which point the log manager 132 flushes the current batch 134 (at 460) and gets another batch (at 462). Then, the activity repeats for the new batch. When flushing the current batch, the log manager 136 provides the batch-flush table 136b for the current batch to lower processing levels (e.g., file system 160), such that the lower levels may take appropriate action, or no action in the case of same-data writes. Whenever an action specified in the batch-flush table 136b is a no-op, both same-data and same-metadata updates are avoided.

Although FIG. 4 shows extents 135 being processed one after another, some embodiments may process extents 135 of a given batch 134 in parallel, e.g., by employing respective threads for respective extents 135. The example as shown is intended merely to be illustrative.

The method 400 enables a variety of scenarios to play out. For instance, after creating the new entry 142 in the dedupe database 140 (at 440), the data storage system 116 may receive another I/O request 112W directed to the same logical address as was the extent for which the new entry 142 was created. When performing the deduplication test on the extent conveyed in the new I/O request, a match may be found to the new entry 142 in the dedupe database 140. Also, the ensuing metadata-match test may detect a match of the respective VBMs. Thus, the method 400 confirms, based on the new entry, that the extent conveyed in the new I/O request is a same-data write and avoids executing the write to persistent storage, for both the data and the mapping metadata.

In another scenario, an I/O request may be directed to a different logical address from the one for which the new extent in the dedupe database 140 was created. If a deduplication match is found to the new entry at 420 but no metadata match is found at 422, the log manager 136 may direct a deduplication of the new extent, e.g., by directing the file system 160 to configure mapping metadata to map the specified logical address to the block pointed to by the matching entry. The I/O request is thus completed without writing the new extent to persistent storage.

One should appreciate that same-data write avoidance and data deduplication work hand-in-hand. For example, creating a new digest entry in the dedupe database 140 for an extent of data enables a later-arriving extent to be flagged as a same-data write, if the locations match, or as a deduplication candidate, if the locations do not match. Once a digest entry has been created, it may be used by either process.

FIG. 5 shows an example method 500 for managing write requests in a data storage system. At 510, an I/O (Input/Output) request 112W is received that specifies a current extent 135 of data to be written to a specified logical address.

At 520, mapping metadata 230 is collected that maps the specified logical address to a corresponding storage location, such as an FSBN. The collected mapping metadata 230 may be placed in the extent-mapping table 136a.

At 530, a dedupe-match test 420 is performed on the current extent 135. The dedupe-match test 420 is configured to (i) produce a first result (Yes) in response to the current extent 135 matching an entry 142 in a deduplication database 140, and (ii) produce a second result (No) otherwise. The deduplication database 140 has multiple entries for respective extents of previously stored data, and each entry includes a reference (Ref) to metadata that maps the respective extent to a respective storage location.

At 540, in response to detecting that the dedupe-match test 420 has produced the first result (Yes), a metadata-match test 422 is performed for the current extent 135. The metadata-match test 422 is configured to (i) produce a Match result in response to the metadata referenced by the matching entry 142 and the mapping metadata 230 of the current extent 135 pointing to a same storage location, and (ii) produce a No-Match result otherwise.

At 550, in response to the metadata-match test 422 producing the Match result, the I/O request 112W is completed without performing any write of the current extent 135 to persistent storage.

An improved technique has been described for managing write requests 112W in a data storage system 116. The technique checks whether newly-arriving data 135 match previously-stored data that have been recorded in a deduplication database 140. If a match is found, the technique compares mapping metadata 230 for the newly-arriving data 135 with mapping metadata for the matching data. If both sets of metadata point to the same storage location, then the newly-arriving data 135 is a same-data write and a new write to disk is avoided, as are updates to mapping metadata.

Having described certain embodiments, numerous alternative embodiments or variations can be made. For example, although certain metadata structures are specifically shown and described, these are merely examples, as other types of metadata structures may be used.

Further, although embodiments have been described in reference to a file system 160, this is also merely an example, as file systems merely provide one way of mapping logical addresses to storage locations.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 470 in FIGS. 4 and 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing write requests in a data storage system, the method comprising:
receiving an I/O (Input/Output) request that specifies a current extent of data to be written to a specified logical address;
collecting mapping metadata that maps the specified logical address to a corresponding storage location;
performing a dedupe-match test on the current extent, the dedupe-match test configured to (i) produce a first result in response to the current extent matching an entry in a deduplication database, and (ii) produce a second result otherwise, the deduplication database having multiple entries for respective extents of previously stored data, each entry including a reference to metadata that maps the respective extent to a respective storage location;
in response to detecting that the dedupe-match test has produced the first result, performing a metadata-match test for the current extent, the metadata-match test configured to (i) produce a Match result in response to the metadata referenced by the matching entry and the mapping metadata of the current extent pointing to a same storage location, and (ii) produce a No-Match result otherwise; and
in response to the metadata-match test producing the Match result, completing the I/O request without performing any write of the current extent and the mapping metadata of the current extent to persistent storage.

2. The method of claim 1, wherein the deduplication database provides a digest for each entry, each digest computed as hash of contents of the respective extent, and wherein performing the dedupe-match test includes matching a hash of contents of the current extent with one of the digests in the deduplication database.

3. The method of claim 2, further comprising:
receiving a second I/O request that specifies a second extent of data to be written to a second logical address in the data storage system;
performing the dedupe-match test on the second extent; and
in response to the dedupe-match test on the second extent producing the second result, creating a second entry in the deduplication database, the second entry including a digest computed from the second extent and a reference to metadata that maps the second logical address to a corresponding storage location in the data storage system where the second extent is persistently stored.

4. The method of claim 3, further comprising:
receiving a third I/O request that specifies a third extent of data to be written to a third logical address;
collecting mapping metadata that maps the third logical address to a corresponding storage location in the data storage system;
performing the dedupe-match test on the third extent, the deduplication operation producing the first result by matching the third extent to the second entry in the deduplication database; and
in response to confirming that both the metadata referenced by the second entry and the mapping metadata that maps the third logical address point to the same storage location, completing the third I/O request without performing any write of the third extent to persistent storage, the third logical address being equal to the second logical address.

5. The method of claim 3, further comprising:
receiving a fourth I/O request that specifies a fourth extent of data to be written to a fourth logical address;
collecting mapping metadata that maps the fourth logical address to a corresponding storage location in the data storage system;
performing the dedupe-match test on the fourth extent, the deduplication operation producing the first result by matching the fourth extent to the second entry in the deduplication database; and
in response to detecting that the metadata referenced by the second entry and the mapping metadata that maps the fourth logical address point to different storage locations, (i) configuring metadata for mapping the fourth logical address to the storage location to which the second logical address is mapped and (ii) completing the fourth I/O request without performing any write of the fourth extent to persistent storage, the fourth logical address being different from the second logical address.

6. The method of claim 5, further comprising:
receiving a fifth I/O request that specifies a fifth extent of data to be written to a fifth logical address;
collecting mapping metadata that maps the fifth logical address to a corresponding storage location in the data storage system;
performing the dedupe-match test on the fifth extent, the deduplication operation producing the first result by matching the fifth extent to the second entry in the deduplication database; and
in response to detecting that the metadata referenced by the second entry and the mapping metadata that maps the fifth logical address point to the same storage location, completing of the fifth I/O request without performing any write of the fifth extent to persistent storage, the fifth logical address being equal to the fourth logical address.

7. The method of claim 2, wherein the current extent is a block-sized extent, and wherein the matching entry is provided for a block stored in the data storage system.

8. The method of claim 2, further comprising:
aggregating a set of data received in I/O (Input/Output) requests into a batch of data in a data log, the batch of data including multiple extents, each extent directed to a respective logical address in the data storage system;
collecting mapping metadata that maps the logical address of each extent to a corresponding storage location in the data storage system;
performing the dedupe-match test on each of the extents in the batch;
for each extent for which the dedupe-match test produces the first result, performing the metadata-matching test, and
for an extent for which the dedupe-match test produces the first result and the metadata-matching test produces the Match result, marking the extent for no action in a batch-flush table, the batch-flush table associating each extent in the batch with a respective action, or no action, to be performed when flushing the batch from the data log.

9. The method of claim 8, further comprising:
for an extent for which the dedupe-match test produces the first result and the metadata-matching test produces the No-Match result, marking the extent for deduplication in the batch-flush table.

10. The method of claim 8, further comprising:
for an extent for which the dedupe-match test produces the second result, marking the extent for one of (i) an overwrite or (ii) an allocating write.

11. The method of claim 8,
wherein collecting the mapping metadata includes associating each of a set of extents in the batch with a respective metadata element that uniquely identifies a storage location of the respective extent, and
wherein performing the metadata-match test on an extent includes (i) comparing the respective metadata element with the metadata referenced by the matching entry for that extent and (ii) producing the Match result in response to the respective metadata element and the metadata referenced by the matching entry being identical.

12. The method of claim 2, further comprising, in response to the metadata-match test producing the Match result, completing the I/O request without performing any updates to mapping metadata for mapping the current extent to persistent storage.

13. A data storage system, comprising control circuitry that includes a set of processing units coupled to memory, the control circuitry constructed and arranged to:
receive an I/O (Input/Output) request that specifies a current extent of data to be written to a specified logical address;
collect mapping metadata that maps the specified logical address to a corresponding storage location;

perform a dedupe-match test on the current extent, the dedupe-match test configured to (i) produce a first result in response to the current extent matching an entry in a deduplication database, and (ii) produce a second result otherwise, the deduplication database having multiple entries for respective extents of previously stored data, each entry including a reference to metadata that maps the respective extent to a respective storage location;

in response to detecting that the dedupe-match test has produced the first result, perform a metadata-match test for the current extent, the metadata-match test configured to (i) produce a Match result in response to the metadata referenced by the matching entry and the mapping metadata of the current extent pointing to a same storage location, and (ii) produce a No-Match result otherwise; and in response to the metadata-match test producing the Match result, complete the I/O request without performing any write of the current extent and the mapping metadata of the current extent to persistent storage.

14. A computer program product including a set of non-transitory, computer-readable media having instructions which, when executed by control circuitry of a data storage system, cause the control circuitry to perform a method for managing write requests, the method comprising:

receiving an I/O (Input/Output) request that specifies a current extent of data to be written to a specified logical address;

collecting mapping metadata that maps the specified logical address to a corresponding storage location;

performing a dedupe-match test on the current extent, the dedupe-match test configured to (i) produce a first result in response to the current extent matching an entry in a deduplication database, and (ii) produce a second result otherwise, the deduplication database having multiple entries for respective extents of previously stored data, each entry including a reference to metadata that maps the respective extent to a respective storage location;

in response to detecting that the dedupe-match test has produced the first result, performing a metadata-match test for the current extent, the metadata-match test configured to (i) produce a Match result in response to the metadata referenced by the matching entry and the mapping metadata of the current extent pointing to a same storage location, and (ii) produce a No-Match result otherwise; and in response to the metadata-match test producing the Match result, completing the I/O request without performing any write of the current extent and the mapping metadata of the current extent to persistent storage.

15. The computer program product of claim 14, wherein the method further comprises, in response to the metadata-match test producing the Match result, completing the I/O request without performing any updates to mapping metadata for mapping the current extent to persistent storage.

16. The computer program product of claim 15, wherein the method further comprises:

receiving a second I/O request that specifies a second extent of data to be written to a second logical address in the data storage system;

performing the dedupe-match test on the second extent; and in response to the dedupe-match test on the second extent producing the second result, creating a second entry in the deduplication database, the second entry including a digest computed from the second extent and a reference to metadata that maps the second logical address to a corresponding storage location in the data storage system where the second extent is persistently stored.

17. The computer program product of claim 15, wherein the current extent is a block-sized extent, and wherein the matching entry is provided for a block stored in the data storage system.

18. The computer program product of claim 15, wherein the method further comprises:

aggregating a set of data received in I/O (Input/Output) requests into a batch of data in a data log, the batch of data including multiple extents, each extent directed to a respective logical address in the data storage system;

collecting mapping metadata that maps the logical address of each extent to a corresponding storage location in the data storage system;

performing the dedupe-match test on each of the extents in the batch;

for each extent for which the dedupe-match test produces the first result, performing the metadata-matching test, and for an extent for which the dedupe-match test produces the first result and the metadata-matching test produces the Match result, marking the extent for no action in a batch-flush table, the batch-flush table associating each extent in the batch with a respective action, or no action, to be performed when flushing the batch from the data log.

19. The computer program product of claim 18, wherein the method further comprises:

for an extent for which the dedupe-match test produces the first result and the metadata-matching test produces the No-Match result, marking the extent for deduplication in the batch-flush table.

20. The computer program product of claim 18, wherein the method further comprises:

for an extent for which the dedupe-match test produces the second result, marking the extent for one of (i) an overwrite or (ii) an allocating write.

21. The method of claim 1, wherein performing the metadata-match test produces the Match result in response to a same-data write of data to a same location at which identical data are already stored.

22. The method of claim 1, wherein collecting the mapping metadata includes collecting a set of pointers to at least one of (i) an inode, (ii) an indirect block (IB), and (iii) a virtual block map (VBM), which maps the specified logical address to the corresponding storage location, said at least one of the inode, the IB, and the VBM having already been created in the data storage system.

23. The method of claim 3, wherein completing the I/O request without performing any write of the current extent to persistent storage also takes place without performing any write of the mapping metadata of the current extent to persistent storage.

* * * * *